United States Patent
Vishne et al.

(10) Patent No.: US 9,952,792 B2
(45) Date of Patent: Apr. 24, 2018

(54) METHODS, SYSTEMS, AND COMPUTER READABLE MEDIA FOR STORAGE DEVICE WORKLOAD DETECTION USING POWER CONSUMPTION

(71) Applicant: SanDisk Technologies LLC, Plano, TX (US)

(72) Inventors: Gadi Vishne, Petach-Tikva (IL); Nir Amir, Beit Hashmonai (IL); Judah Gamliel Hahn, Ofra (IL)

(73) Assignee: SanDisk Technologies LLC, Plano, TX (US)

( * ) Notice: Subject to any disclaimer, the term of this patent is extended or adjusted under 35 U.S.C. 154(b) by 128 days.

(21) Appl. No.: 15/051,254

(22) Filed: Feb. 23, 2016

(65) Prior Publication Data
US 2017/0242607 A1  Aug. 24, 2017

(51) Int. Cl.
*G06F 13/00* (2006.01)
*G06F 3/06* (2006.01)
*G06F 13/24* (2006.01)

(52) U.S. Cl.
CPC ............ *G06F 3/0625* (2013.01); *G06F 3/065* (2013.01); *G06F 3/0679* (2013.01); *G06F 13/24* (2013.01)

(58) Field of Classification Search
CPC ................................ G06F 13/24; G06F 3/0679
See application file for complete search history.

(56) References Cited

U.S. PATENT DOCUMENTS

2010/0275050 A1* 10/2010 Hong .................. G06F 1/266
713/324

OTHER PUBLICATIONS

"NVM Express," Specification Revision 1.2, http://nvmexpress.org/wp-content/uploads/NVM_Express_1_2_Gold_20141209.pdf, pp. 1-205 (Nov. 3, 2014).
"PCI Express," Base Specification Revision 3.0, pp. 1-860 (Nov. 10, 2010).

* cited by examiner

*Primary Examiner* — Zachary K Huson
(74) *Attorney, Agent, or Firm* — Vierra Magen Marcus LLP

(57) ABSTRACT

Methods, systems, and computer readable media for storage device workload detection using power consumption are disclosed. One aspect of the subject matter described herein includes a storage device. The storage device includes non-volatile storage. The storage device further includes a device controller for controlling access to the non-volatile storage. A power management controller separate from the device controller senses an indication of power used by at least one of the non-volatile storage and the device controller, compares the sensed indication of power to at least one threshold, and, in response to a predetermined relationship between the sensed indication of power and the at least one threshold, signals the device controller of a workload state of the storage device.

23 Claims, 3 Drawing Sheets

METHODS, SYSTEMS, AND COMPUTER READABLE MEDIA FOR STORAGE DEVICE WORKLOAD DETECTION USING POWER CONSUMPTION

TECHNICAL FIELD

The subject matter described herein relates to storage device workload detection. More particularly, the subject matter described herein relates to methods, systems, and computer readable media for storage device workload detection using power consumption.

BACKGROUND

Storage devices, such as NAND storage devices, require certain maintenance operations (such as read scrubbing and folding operations) for optimal performance and endurance. In many cases, these maintenance operations are scheduled such that the operations are performed at idle time or are balanced against host initiated operations to reduce their direct impact on storage device performance. In order to perform such operations at optimal times, it is desirable to have an indication of the workload of the storage device. Current storage device workload detection relies on the device controller sensing its own workload and performing the background operations when the controller is idle. Using the device controller to monitor its own workload to determine when to schedule background tasks has a negative impact on storage device performance because device controller resources used to monitor performance are unavailable for other tasks, such as host-initiated I/O. Requiring that the device controller monitor and make the determination as to when to schedule background tasks also increases the complexity in device controller operations and design.

BRIEF DESCRIPTION OF THE DRAWINGS

The subject matter described herein will now be explained with reference to the accompanying drawings of which.

DETAILED DESCRIPTION

Methods, systems, and computer readable media for storage device workload detection using power consumption are disclosed. One aspect of the subject matter described herein includes a storage device. The storage device includes non-volatile storage. The storage device further includes a device controller for controlling access to the non-volatile storage. A power management controller separate from the device controller senses an indication of power used by at least one of the non-volatile storage and the device controller, compares the sensed indication of power to at least one threshold, and, in response to a predetermined relationship between the sensed indication of power and the at least one threshold, signals the device controller of a workload state of the storage device.

Figure 1:
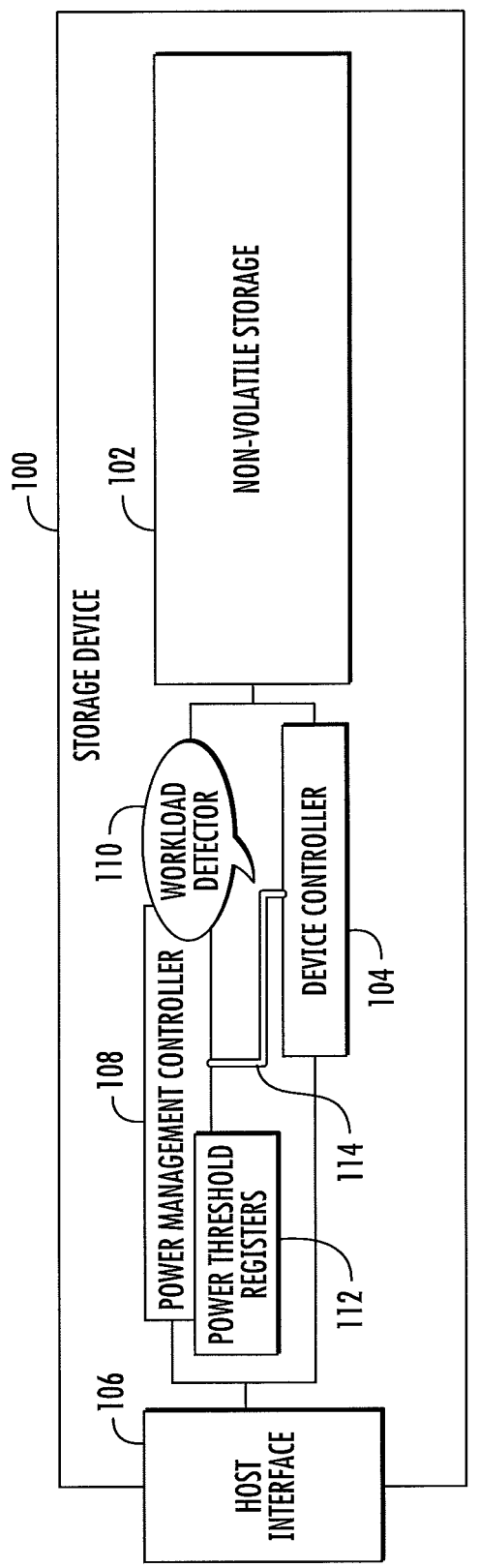
FIG. 1 is a block diagram of a storage device including a power management controller with an integrated workload detector according to an embodiment of the subject matter described herein.

FIG. 1 is a block diagram of a storage device that includes a power management controller with an integrated workload detector according to an embodiment of the subject matter described herein. Referring to FIG. 1, storage device 100 includes non-volatile storage 102 and a device controller 104. Non-volatile storage 102 may be 2D or 3D NAND flash memory, NOR flash memory, or a combination thereof. Device controller 104 may be a storage controller that controls access to non-volatile storage 102. For example, device controller 104 may be the device that performs host-initiated I/O operations, such as read and write operations, to non-volatile storage 102. The storage device further includes a host interface 106 for communication with a host device in which storage device 100 is inserted or coupled. Host interface 106 may implement any suitable protocols for communicating with a host, including non-volatile memory express (NVMe) over peripheral component interface express (PCIe), serial ATA (SATA), or other suitable protocols.

Storage device 100 further includes a power management controller 108 for managing power used by storage device 100. According to an aspect of the subject matter described herein, power management controller 108 includes a workload detector 110 that detects the current workload of storage device 100 using power consumption of non-volatile storage 102 and/or device controller 104 interrupts device controller 104 when an intensive workload state or a non-intensive workload state is detected. Power management controller 108 may further include power threshold registers 112 that store upper and lower power thresholds used to control when workload detector 110 signals or interrupts device controller 104 of a change in workload state. A communication channel 114 may exist between power management controller 108 and device controller 104 for communication of the workload state of storage device 100. Communication channel 114 may be a physical conductor, a wireless channel, or an optical channel. In one implementation, each of the device controller and the power management controller may have an additional pin for the high and low workload condition interrupt with a physical conductor connecting the pin on the power management controller to the pin on the device controller.

Figure 2:
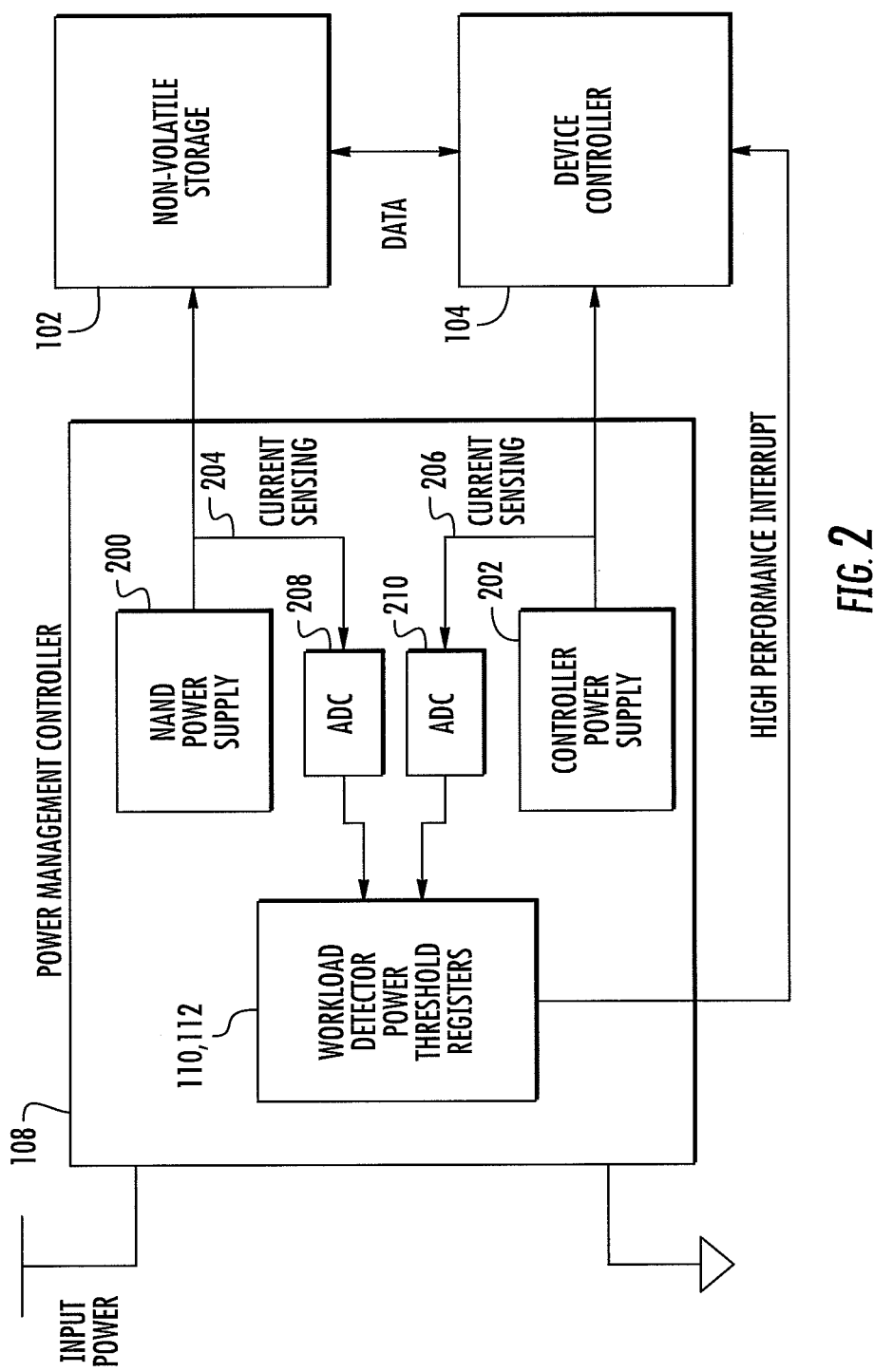
FIG. 2 is a block diagram illustrating an exemplary internal architecture for a power management controller with an integrated workload detector according to an embodiment of the subject matter described herein.

FIG. 2 is a block diagram illustrating additional details of storage device 100 and power management controller 108. Referring to FIG. 2, power management controller 108 includes workload detector 110 and power threshold registers 112 that output or signal power management states to device controller 104 in response to a predetermined relationship between sensed power consumption and the thresholds. Power management controller 108 further includes NAND power supply 200 for providing power to non-volatile storage 102 and controller power supply 202 for providing power to device controller 104. Sensors 204 and 206 may sense an indication of power used by non-volatile storage 102 and device controller 104. In the illustrated example, sensors 204 and 206 are current sensors that sense current used by non-volatile storage 102 and by device controller 104. However, the subject matter described herein is not limited to using current as an indication of power consumption. Actual power consumed can also be used without departing from the scope of the subject matter described herein.

Current sensors 204 and 206, in one example, may output continuous valued (i.e., analog) current signals to analog to digital converters (ADCs) 208 and 210, respectively. ADCs 208 and 210 produce digital samples indicative of sensed current values. Workload detector 110 may sample the digital current values output by ADCs 208 and 210 at predetermined intervals, such as once every 100 microseconds.

Workload detector 110 may use an average of a predetermined number of samples, such as a sliding window of the last twenty samples, to determine whether to trigger an interrupt to device controller 104. Using multiple samples and an average may increase the likelihood that only high performance cases trigger the interrupt and short term NAND access will not trigger the interrupt.

ADCs 208 and 210 provide the sensed current samples to workload detector 110. Workload detector 110 averages the samples and compares the samples to predetermined thresholds. If workload detector 110 determines that an upper threshold (e.g., either the controller current or the non-volatile storage current threshold) is exceeded, workload detector 110 may generate a high workload interrupt to device controller 104, which causes device controller 104 to halt existing background tasks and/or prevent the scheduling of future background tasks while the high workload interrupt is valid. In one exemplary implementation, the high workload interrupt may remain valid after it is triggered and until a low workload interrupt is triggered.

It should be noted that not all background tasks may be prevented when the high workload interrupt is valid. For example, some background tasks, such as emergency reclaim operations, may be performed regardless of the validity of the high workload interrupt.

Workload detector 110 may also determine when the sensed currents are below a lower threshold (preferably spaced from the upper threshold to prevent continuous switching between states) to determine when the scheduling of background tasks is appropriate. If both sensed current values are below the lower threshold, workload detector 110 may generate a second interrupt (i.e., the low workload interrupt) which indicates an idle state to device controller 104 and causes device controller 104 to schedule background operations. The low workload interrupt may remain valid after it is triggered until the high workload interrupt is triggered. While the low workload interrupt is valid, device controller 104 may perform background tasks, such as maintenance operations, on non-volatile storage 102.

Using samples of currents provided to device controller 104 and to non-volatile storage 102 enables intensive workload detection when the workload is primarily caused by memory read operations or memory write operations. For example, during an intensive workload state caused by memory read operations, the current drawn by device controller 104 will be relatively high, and the current drawing by non-volatile memory 102 may not be relatively high. During memory write operations, the current drawn by non-volatile memory 102 may be relatively high, and the current drawn by device controller 104 may not be relatively high. Thus, using both currents to detect an intensive workload state provides for optimal scheduling of background tasks. However, the subject matter described herein is not limited to using both currents to detect an intensive workload state. Using either the current drawn by the device controller or by the non-volatile memory alone is intended to be within the scope of the subject matter described herein.

Figure 3:
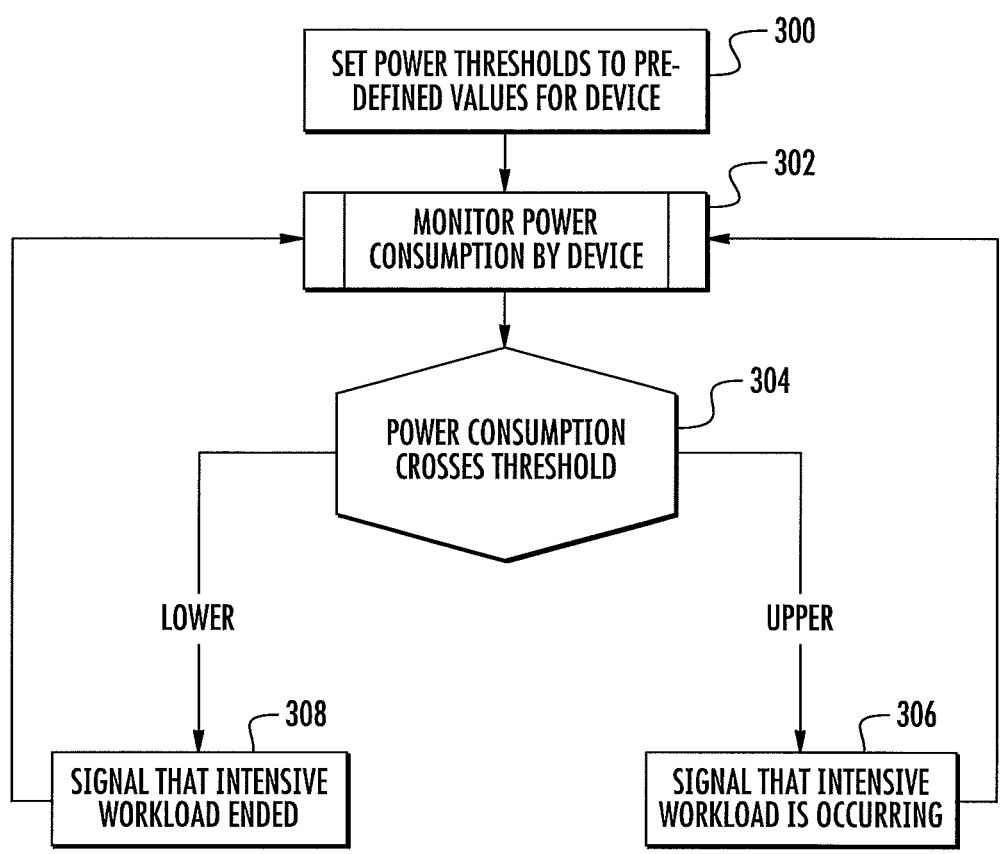
FIG. 3 is a flow chart illustrating an exemplary process for a storage device workload detection using power consumption according to an embodiment of the subject matter described herein.

FIG. 3 is a flow chart illustrating an exemplary process that may be performed by workload detector 110 and sensors 204 and 206. Referring to FIG. 3 in step 300, power thresholds are set for the device. As stated above, the power thresholds may include an upper threshold and a lower threshold that are spaced from one another. In addition, the same or different thresholds may be set for device controller 104 and non-volatile storage 102. The power thresholds may be set by the user or by a device manufacturer. The power thresholds may be stored in power threshold registers 112 accessible by workload detector 110.

In step 302, power consumption of the storage device is monitored. Monitoring the power consumption may include sampling the currents drawn by non-volatile storage 102 and/or device controller 104. In step 304, it is determined whether the power consumption of storage device 100 has crossed a threshold. Determining whether the power consumption has crossed a threshold may include comparing the sensed current values to an upper threshold and a lower threshold. If either of the sensed current values exceeds the upper threshold, control proceeds to step 306 where workload detector 110 signals device controller 104 that an intensive workload is occurring. In response to a determination that an intensive workload is occurring, device controller 104 may halt current background operations and prevent the scheduling of background operations while the intensive workload is occurring.

In step 304, if it is determined that power consumption is below the lower threshold, control proceeds to step 308 where workload detector 110 signals device controller 104 that the intensive workload has ended or that the storage device is not in an intensive workload state. Determining that the intensive workload state has ended or is not present may include determining that the average power values computed for both current signals are below their respective lower thresholds. In response to the signal in step 308 indicating that the storage device is not in an intensive workload state, device controller 104 may schedule background tasks. Examples of background tasks that may be scheduled include housekeeping operations, such as read scrubbing and folding operations.

Accordingly, the subject matter described herein improves existing storage device utilization by freeing the device controller from the task of storage device workload detection. As a result, the need for internal scheduling algorithms implemented by the device controller for workload detection is reduced and the overall efficiency of the storage device is increased.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A storage device comprising:
   non-volatile storage;
   a device controller for controlling access to the non-volatile storage; and
   a power management controller separate from the device controller, the power management controller configured to sense an indication of power used by the non-volatile storage, to sense an indication of power used by the device controller, to compare the sensed indication of power used by the non-volatile stores and the sensed indication of power used by the device controller to at least one threshold, and, in response to a predetermined relationship between either the sensed indication of power used by the non-volatile stores or the sensed indication of power used by the device controller and the at least one threshold, to signal the device controller of a workload state of the storage device.

2. The storage device of claim 1 wherein the non-volatile storage comprises NAND or NOR flash memory.

3. The storage device of claim 1 wherein the indication of power used by the non-volatile storage comprises a current drawn by the non-volatile storage.

4. The storage device of claim 1 wherein the indication of power used by the device controller comprises a current drawn by the device controller.

5. The storage device of claim 4 wherein the indication of power used by the non-volatile storage comprises current drawn by the non-volatile storage.

6. The storage device of claim 5 wherein the power management controller is configured to interrupt the device controller in response to a determination that at least one of the current drawn by the non-volatile storage and the current drawn by the device controller exceeds an upper threshold.

7. The storage device of claim 5 wherein the power management controller is configured to interrupt the device controller in response to a determination that both the current drawn by the device controller and the current used by the non-volatile storage are below a lower threshold.

8. The storage device of claim 7 wherein the device controller is configured to perform a background task in response to the interrupt indicating that both currents are below the lower threshold.

9. The storage device of claim 1 wherein the power management controller is configured to sense the indication by sampling a signal on a conductor that supplies power to the non-volatile storage at a predetermined sampling interval.

10. The non-volatile storage device of claim 9 wherein the power controller is configured to collect a sliding window of samples of the signal, average the samples, and compare the average to the at least one threshold.

11. The storage device of claim 1 wherein the power management controller includes at least one power threshold register for storing the at least one threshold.

12. A method comprising:
    providing non-volatile storage;
    controlling access to the non-volatile storage using a device controller;
    sensing, using a power management controller separate from the device controller, an indication of power used by the non-volatile storage;
    sensing, using a power management controller, an indication of power used by the device controller;
    comparing, by the power management controller, the sensed indication of power used by the non-volatile stores and the sensed indication of power used by the device controller to at least one threshold; and
    in response to a predetermined relationship between either of the sensed indication of power used by the non-volatile stores or the sensed indication of power used by the device controller and the at least one threshold, signaling the device controller of a workload state of the storage device.

13. The method of claim 12 wherein the non-volatile storage comprises NAND or NOR flash memory.

14. The method of claim 12 wherein the indication of power used by the non-volatile storage comprises a current drawn by the non-volatile storage.

15. The method of claim 12 wherein the indication of power used by the device controller comprises a current drawn by the device controller.

16. The method of claim 15 wherein the indication of power used by the non-volatile storage comprises current drawn by the non-volatile storage.

17. The method of claim 16 wherein signaling the device controller of the workload state of the storage device comprises interrupting the device controller in response to a determination that at least one of the current drawn by the non-volatile storage and the current used by the device controller exceeds an upper threshold.

18. The method of claim 16 wherein signaling the device controller of the storage device comprises interrupting the device controller in response to a determination that both the current used by the device controller and the current used by the non-volatile storage are below a lower threshold.

19. The method of claim 18 comprising performing a background task in response to the interrupt indicating that both currents are below the lower threshold.

20. The method of claim 12 wherein sensing the indication includes sampling a signal on a conductor that supplies power to the non-volatile storage at a predetermined sampling interval.

21. The method of claim 20 wherein sensing the indication includes collecting a sliding window of samples of the signal and averaging the samples and wherein comparing the sensed indication to at least one threshold comprises comparing the average to the at least one threshold.

22. The method of claim 12 comprising storing the at least one threshold in at least one power threshold register.

23. A non-transitory computer readable medium having stored thereon executable instructions that when executed by a processor of a computer control the computer to perform steps comprising:
    controlling access to non-volatile storage using a device controller; and
    sensing, using a power management controller separate from the device controller, an indication of power used by the non-volatile storage;
    sensing, using a power management controller, an indication of power used by the device controller;
    comparing the sensed indication of power used by the non-volatile stores and the sensed indication of power used by the device controller to at least one threshold; and in response to a predetermined relationship between either of the sensed indication of power used by the non-volatile stores or the sensed indication of power used by the device controller and the at least one threshold, signaling the device controller of a workload state of the storage device.

\* \* \* \* \*